NEGATIVE RESISTANCE DIODE MULTIVIBRATORS

Filed April 21, 1960 2 Sheets-Sheet 1

INVENTORS
HERBERT RUBENSTEIN &
ANATOL G. SAMUSENKO
BY John V. Regan
Attorney

NEGATIVE RESISTANCE DIODE MULTIVIBRATORS

Filed April 21, 1960

INVENTORS
HERBERT RUBENSTEIN &
ANATOL G. SAMUSENKO
BY John V. Regan
Attorney

3,087,123
NEGATIVE RESISTANCE DIODE MULTIVIBRATORS

Herbert Rubenstein, Philadelphia, Pa., and Anatol G. Samusenko, Lakewood, N.J., assignors to Radio Corporation of America, a corporation of Delaware Filed Apr. 21, 1960, Ser. No. 23,721
20 Claims. (Cl. 331—107)

This invention relates to multivibrators and, more particularly, to multivibrators using two-terminal devices having a volt-ampere characteristic with a negative resistance portion.

Multivibrators may be classified generally as astable, monostable, or bistable, depending upon their mode of operation. An astable multivibrator, also known as a free running multivibrator, may be defined as a multivibrator that can function in either of two semistable states, switching rapidly from one to the other without external trigger signal. The astable multivibrator is a form of relaxation oscillator, and the output thereof is nonsinusoidal, being generally of the square wave type.

A monostable multivibrator, or "one-shot," is a circuit having one stable and one semistable condition. A trigger may be applied to drive the unit into the semistable state where it remains for a predetermined time before returning to the stable condition. The cycle times of the astable and monostable multivibrators may be predetermined by suitable selection of the circuit parameters.

A bistable multivibrator is a circuit with two stable states which requires triggering to switch the circuit from one state to the other. Two trigger pulses are required to complete a cycle of operation.

Many multivibrator circuits of the prior art have the disadvantage of high power requirements, which make such circuits undesirable in equipment wherein close packing densities are required. Other multivibrators are limited in speed by minority carrier storage effects.

It is an object of this invention to provide novel multivibrator circuits which do not have the above disadvantages.

It is another object of this invention to provide novel multivibrator circuits which have a reduced number of components.

It is still another object of this invention to provide novel astable and bistable multivibrators which are simple and inexpensive.

Yet another object of this invention is to provide novel astable and bistable multivibrators which provide output signals having fast rise and fall times.

Still another object of this invention is to provide novel multivibrator circuits which satisfy the above objects and which use as active elements two-terminal negative resistance devices.

These and other objects of the invention are accomplished by a circuit comprising first and second parallel branches including, respectively, first and second two-terminal, negative resistance devices; means magnetically coupling said branches; and means for biasing said devices for operation as a multivibrator.

Figure 1:
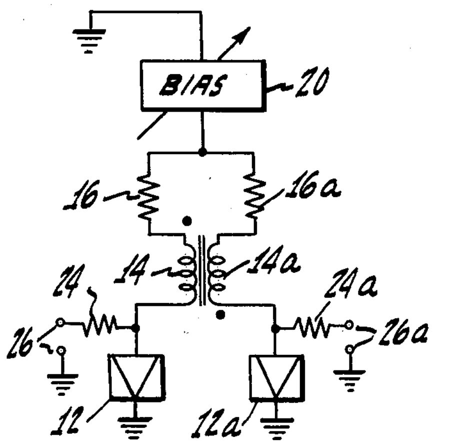
FIGURE 1 is a schematic drawing of the basic multivibrator circuit.
Figure 5A:
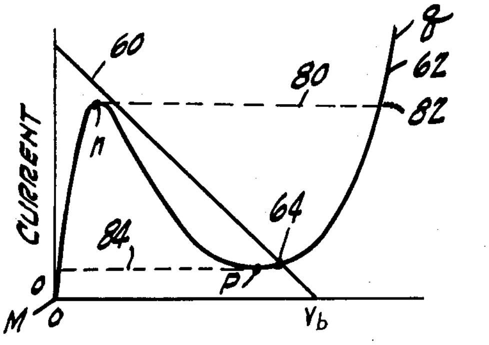
Figure 5B:
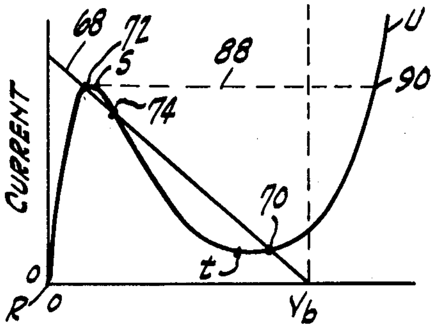
Figure 6:
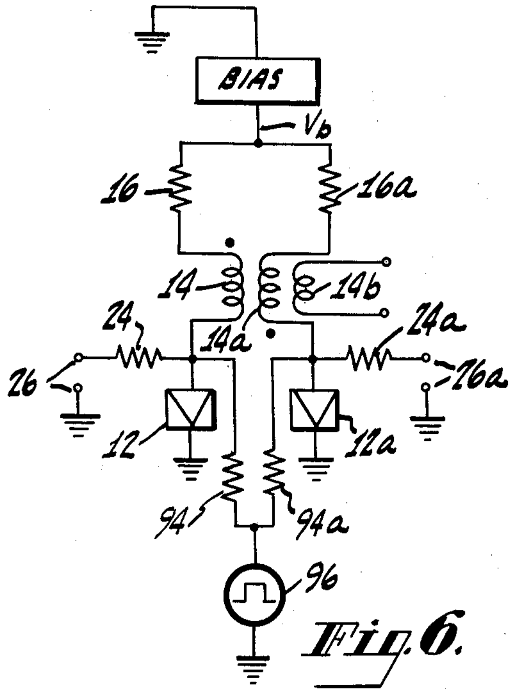
Figure 7:
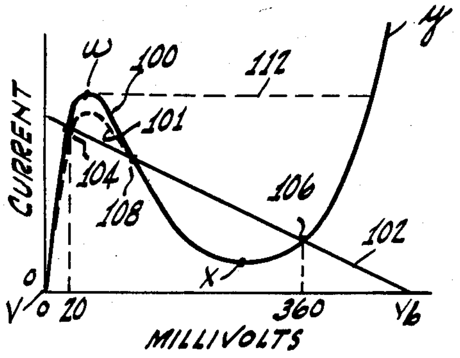

FIGURES 5*a* and 5*b* are curves useful in explaining a second mode of operation of the FIGURE 1 circuit as an astable circuit;

FIGURE 6 is a schematic diagram of a bistable multivibrator arranged as a complementing flip-flop; and FIGURE 7 is a curve useful in explaining the operation of the bistable circuit.

FIGURE 1 illustrates schematically the basic circuit of a multivibrator having parallel circuit branches, each including a different two-terminal negative resistance device. A first parallel branch comprises a negative resistance device 12, an inductor 14 and a resistor 16 serially connected between a point of reference potential, indicated as circuit ground, and one terminal of a biasing source 20. The other terminal of the biasing source 20 is connected to ground. The biasing source 20 is made adjustable and may be, for example, a variable resistance element connected across the terminals of a battery, and having an adjustable tap.

The second circuit branch comprises the series combination of a negative resistance device **12*a*, an inductor 14*a* and a resistor 16*a* connected between circuit ground and the ungrounded terminal of the biasing source 20. The inductors 14, 14*a* function as a transformer to couple magnetically the two parallel branches. The inductors 14, 14*a* are coupled preferably by a high permeability material to increase the coupling efficiency. The inductors 14, 14*a*** are wound in the opposite sense, as indicated by the conventional "dot" symbol.

A decoupling resistor 24 is connected between the ungrounded terminal of the first negative resistance device 12 and the ungrounded one of a pair of output terminals 26. Another decoupling resistor **24*a* is connected between the ungrounded terminal of the second negative resistance device 12*a* and the ungrounded one of a second pair of output terminals 26*a*. Output signals may be derived at either or both pair of output terminals 26, 26*a***. In FIGURE 1, like reference numerals refer to like components.

The two-terminal, negative resistance device 12, **12*a* may be, for example, negative resistance diodes of the type described in the article by H. S. Sommers, Jr., in the Proceedings of the I.R.E., July 1959, page 1201, and in other publications, and known in the art as "tunnel diodes." In FIGURE 1 the grounded terminals of the negative resistance device 12, 12*a*** are cathodes; the ungrounded terminals are anodes. The characteristics of such negative resistance diodes are fully set forth in the aforementioned article and will not be described further except as may be necessary to explain the operation of the multivibrator.

Figure 2:
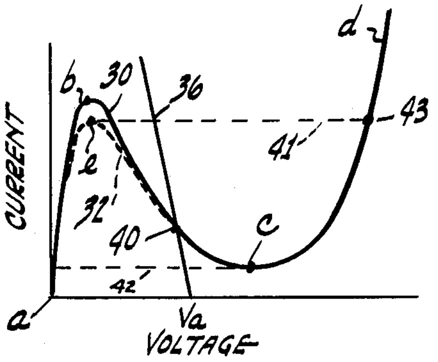
FIGURES 2 and 4 are sets of curves useful in explaining a first mode of operation of the FIGURE 1 circuit as an astable multivibrator.

A negative resistance diode has a volt-ampere characteristic of the general type illustrated by the characteristic curve 30 of FIGURE 2. The characteristic curve 30 has two portions *ab* and *cd* of positive resistance and a region *bc* of negative resistance. More particularly, the increment $$\frac{\Delta v}{\Delta I}$$

has a positive value in the regions *ab* and *cd*, and a negative value in the region *bc*. Voltage is plotted along the abscissa, and the current through the diode is plotted along the ordinate. The point *b* is a point of transition between positive and negative resistance. Point *c* is another transition point for the curve 30.

The characteristic curve 32, shown dotted in FIGURE 2, is similar generally to the characteristic curve 30 just described. It will be noted, however, that some of the slopes and transition points of the two curves 30, 32 are slightly different. Such differences are due primarily to manufacturing tolerances and are made use of in the FIGURE 1 circuit operating as an astable multivibrator.

In one embodiment of an astable multivibrator according to the invention, the resistors 16, **16*a* are selected so that the negative resistance diodes 12, 12***a* have the load line 36 illustrated in FIGURE 2. The values of the resistors 16, 16*a* are less than the negative resistance of the diodes 12, 12*a*. The load line 36 crosses the volt-ampere characteristics 30, 32 at a point 40 in the negative resistance region. The circuit is unstable when so biased, and the circuit including the diodes 12, 12*a* therefore oscillates.

Assume that the diode 12 has the characteristic curve 32 and that the diode 12*a* has the characteristic 30. Consider now the operation of the first circuit branch including diode 12, and neglect for the present the magnetic coupling between the branches. When the circuit is energized initially, as by increasing the bias from zero volts to $+V_a$ volts, current through the diode 12 increases along the curve portion *ae* until point *e* is reached. Diode 12 then switches rapidly through the negative resistance region along a path 41 of substantially constant current to the point 43 in the high voltage region *cd*. The bias voltage $V_a$ tends to force the diode 12 to the operating point 40. Current through the diode 12 decreases along the curve portion *dc* until point *c* is reached. At this point *c*, the diode 12 switches rapidly back through the negative resistance region along a substantially constant current path 42 to the low voltage region *ab*. The above-described action is then repeated and the diode 12 continues to oscillate.

The second circuit branch including diode 12*a* operates in a similar manner, neglecting the magnetic coupling. When the two branches are magnetically coupled, however, energy is transferred between the branches by transformer action of the inductors 14, 14*a*. The diode 12 switches to the high state at a time prior to diode 12*a* because the current knee (point *e*) of the curve 32 is lower than that of curve 30. Although the theory of operation of the FIGURE 1 circuit as an astable oscillator is not completely understood, it is believed that the mutual inductance coupling provides a triggering action of one circuit branch upon the other. The energy transfer between the circuit branches enhances the switching inherent to the diodes 12, 12*a*.

Regardless of the exact phenomenon involved, however, it has been found that the circuit has a much greater variation in frequency, due to the energy transfer means 16, 16*a*, than may be obtained from either branch operated independently. Moreover, it has been found that the FIGURE 1 circuit provides very fast rise and fall times of the output waveforms.

Figure 3:
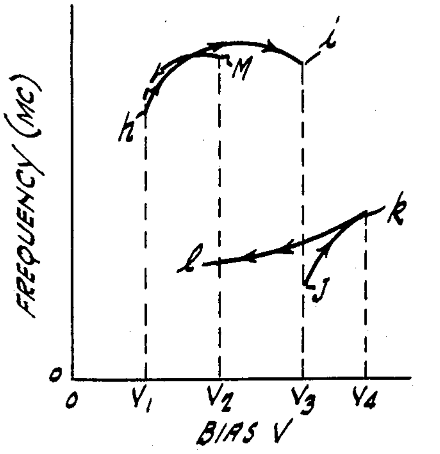
FIGURE 3 is a plot of frequency versus bias voltage for the astable multivibrator.

It has been found that the frequency of the astable oscillations is a function of the bias voltage applied across the circuit. FIGURE 3 is a plot of the frequency as a function of bias voltage. Oscillations commence at a bias voltage $V_1$, at which bias one of the diodes 12, 12*a* is biased into the negative resistance region. As the bias is increased further, the frequency of oscillations increases to a maximum and then decreases with further increase in bias until the bias voltage has a value $V_3$. An abrupt discontinuity occurs at $V_3$, and the frequency of oscillations drops to a low value. Further increase in bias from $V_3$ results in an increase in frequency until a bias of $V_4$ volts is reached. Oscillations cease at a bias of $V_4$ volts, at which time both diodes are biased in the positive resistance region of high voltage. Oscillations commence again and decrease in frequency as the bias voltage is steadily decreased below $V_4$ volts. A second abrupt discontinuity occurs at $V_2$ volts, and the frequency jumps to a high value. Further decrease in bias results in a decrease in oscillating frequency until oscillations cease at a bias of $V_1$ volts. The outputs at the output terminals 26, 26*a* differ only slightly in phase when the circuit is operated in the regions *hi* and *mh* of the hysteresis loop of FIGURE 3, and are approximately 180° out of phase during the portion *jkl* of the hysteresis loop. The output signals are essentially square waves.

Figure 4:
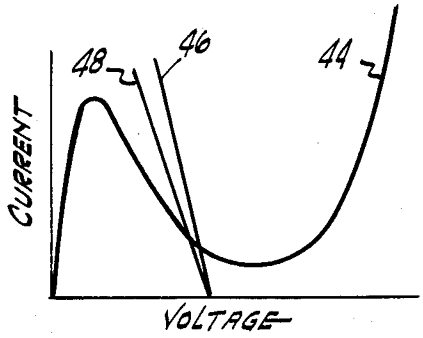

In those instances where the characteristic curve of the diodes 12, 12*a* are identical, or nearly so, astable operation of the type described may be obtained by adjusting the values of the resistors 16, 16*a* such that the load lines for the two diodes 12, 12*a* are slightly different. Assume that both diodes 12, 12*a* have the characteristic curve 44 illustrated in FIGURE 4. The resistors 16, 16*a* may be adjusted such that the diodes 12, 12*a* have the load lines 46, 48, respectively. The resistor 16 has the smaller value in this case, and both resistors 16, 16*a* have lower resistance values than the negative resistance of the diodes 12, 12*a*. Diode 12 switches to the high voltage state before diode 12*a* when the circuit is energized initially. This is so because the diode 12 is biased into the negative resistance region prior to diode 12*a* because of the difference in slopes of the load lines 46, 48. The hysteresis effect in the frequency versus bias voltage, illustrated in FIGURE 3, holds generally for this case where the diode 12, 12*a* characteristics are the same and the load lines are different, as illustrated in FIGURE 4. The points *i*, *l* of discontinuity may be different, however.

A second mode of astable operation occurs when the resistors 16, 16*a* of FIGURE 1 are adjusted to have resistance values greater than the negative resistance of the diodes 12, 12*a*. For purposes of illustration, FIGURES 5*a* and 5*b* illustrate, respectively, the characteristics of the diodes 12, 12*a*. The resistor 16 is adjusted so that the diode 12 has the load line 60 illustrated in FIGURE 5*a*. The biasing voltage is adjusted so that the load line 60 intersects the characteristic 62 at a point 64 in the positive resistance region *pq* of high voltage and has no intersection with the positive resistance region *mn* of low voltage or the negative resistance region *np*. The diode 12 is then biased for monostable operation.

The resistor 16*a* is adjusted so that the diode 12*a* has a load line 68 which intersects the positive resistance region *tu* of high voltage at a point 70 and intersects the positive resistance region *rs* of low voltage and the negative resistance region *st* at points 72, 74, respectively. It is to be noted that the dynamic resistance of diode 12 has a relatively low value in the region *mn* (FIGURE 5*a*) and has a relatively high value in the region of the point 64. An inherent capacitance exists between the terminals of the diode 12. If the capacitive time constant of this capacitance and the diode 12 resistance in the vicinity of point 64 is of the order of the inductive time constant determined by inductor 14 and resistor 16, the first branch is underdamped in the region of point 64.

When the circuit is energized initially and the bias voltage is increased from 0 to $V_b$, the current in the second branch comprising diode 12*a* stabilizes at a value corresponding to the point 72 (of FIG. 5*b*) of stable operation. The load line 60 of the diode 12 in the first branch, however, has no intersection with the positive resistance region *mn* (FIG. 5*a*). The diode 12, therefore, switches rapidly through the negative resistance region to the high voltage state. The diode 12 may switch along a constant current line, for example line 80 (FIG. 5*a*), because of the effect of the inductor 14. The current through diode 12 then decreases rapidly along the curve portion *pq* from the point 82 to the point 64. The current then tends to stabilize at a value corresponding to the point 64. Due to the aforementioned underdamping in the region of the intersecting point 64, the current overshoots the point 64 and the diode switches rapidly through the negative resistance region, for example along the line 84. The current then increases along the portion *mn* of the characteristic curve 82. The voltage induced in the inductor 14*a* when diode 12 current is increasing in the region *mn* is of such polarity as to switch the second diode 12*a* rapidly through the negative resistance region. The diode 12*a* may switch along the constant current line 88 (FIG. 5*b*) to a point 90 of intersection with the portion *tu* of the characteristic curve. The current through diode 12a then decreases to the stable point 70 of high voltage.

The diode 12 does not reach a quiescent condition in the low voltage region *mn* (FIG. 5*a*), however, because the load line 60 has no intersection with the portion *mn* of the characteristic curve 62. The diode 12, therefore, again switches to the high voltage region along the constant current line 80. Voltage induced in the inductor 14 as the current through diode 12a decreases along the portion *ut* (FIG. 5*b*) of the characteristic enhances switching of diode 12. As the current in the diode 12 decreases toward the point 64 (FIG. 5*a*), the voltage induced in the inductor 14a is of such polarity as to switch the diode 12a back to the low voltage region. Energy is transferred between branches whenever a diode switches. As the current through one diode is increasing, current through the other diode is decreasing because of the regenerative coupling. Switching action is continuous at a frequency determined by the circuit parameters and by the bias voltage. Variation of the bias voltage changes the frequency over a smaller range than is obtainable in the first mode of operation described previously. This is so because there is only a small range of bias voltages wherein the diode 12 is biased monostably and the diode 12a is biased bistably. The outputs at the terminals 26, 26a are essentially square waves.

A bistable trigger circuit is illustrated schematically in FIGURE 6. The basic circuit is similar structurally to the circuit of FIGURE 1 and like components are designated by like reference characters. The FIGURE 6 circuit is arranged as a complementing flip-flop. A first resistor 94 is connected between the ungrounded terminal of the diode 12, and one terminal of a trigger input source 96. A second resistor 94a is connected between the ungrounded terminal of the diode 12a and said one terminal of the trigger source 96. The other terminal of the trigger source 96 is connected to ground. The trigger source 96 may be a source of current or voltage pulses. In the latter event, the resistor 94, 94a may have such value that the input pulses applied to the diodes 12, 12a appear as current pulses. Pulses from the trigger source 96 may be applied to the circuit at random.

The diodes 12, 12a may have the volt-ampere characteristic 100, 101 illustrated in FIGURE 7. Note that the knee of the curve 101 has a lower current value than the knee of the curve 100. The resistors 16, 16a have such value as to provide the load line 102 when the bias voltage is $+V_b$ volts. The load line 102 intersects the positive resistance region *vw* at a point 104 and intersects the positive resistance region *xy* of high voltage at a point 106. Operating points on the curve 101 differ only slightly, if at all. These two points 104, 106 of intersection are points of stable operation and may correspond, respectively, to storage of a binary "zero" and a binary "one." The load line 102 also has a point 108 of intersection with the negative resistance region *wx*. The point 108 is a point of unstable operation.

When the circuit is energized initially, both diodes 12, 12a reach a quiescent condition corresponding to the point 104. The voltage across the diodes 12, $12^a$ is approximately 20 millivolts at this time. A first positive input pulse from the trigger source 96 causes the diode 12 or 12a having the lowest knee (that is, the characteristic 101) to switch to the high voltage state. The diode may switch along a constant current line substantially parallel to the constant current line 112 for reasons described previously. The current through this diode then decreases rapidly and stabilizes at the point 106. Energy transfer between circuit branches is such as to prevent the other diode from switching in response to the first applied input pulse.

Assume that diode 12 has the characteristic 101. This diode 12 is now in the high voltage stable state, and the voltage across the diode 12 is approximately 360 millivolts. The next applied trigger pulse is applied to both diodes 12, 12a. No switching of the diode 12 occurs in response to the input pulse, however, because this diode is already in the high state. The positive input pulse, however, switches the other diode rapidly through the negative resistance region to the high voltage state, causing a high rate of current change through the inductor 14a to induce a pulse in the inductor 14. The induced pulse is of such polarity as to trigger the diode 12 to the low voltage state. Diode 12 then reaches a quiescent state corresponding to the point 104 of low voltage and diode 12a reaches a quiescent condition corresponding to the point 106 of high voltage. Successive input pulses from the trigger source 106 switch the diodes 12, 12a alternately. Output signals of opposite polarity appear across the output terminals 26, 26a. If a pulse output is desired, an additional transformer winding 14b may be magnetically coupled to the transformer comprising inductors 14, 14a. The input pulses from the trigger source 96 are preferably short compared to the transient of the bistable circuit.

What is claimed is:

1. An electrical circuit comprising: first and second circuit branches including first and second two-terminal devices, respectively, each of said devices having a volt-ampere characteristic with a negative resistance region; means magnetically coupling said branches; and means for biasing said devices for operation as a multivibrator.

2. An electrical circuit as claimed in claim 1, wherein said devices are tunnel diodes.

3. An electrical circuit comprising: first and second circuit branches including, respectively, first and second two-terminal devices, each of said devices having a volt-ampere characteristic with a negative resistance region; means magnetically coupling two like terminals of said devices; and means for biasing said devices for operation as a multivibrator.

4. An electrical circuit comprising, in combination: first and second branches connected in parallel and including, respectively, first and second two-terminal devices, each of said devices having a volt-ampere characteristic with a negative resistance region; transformer means coupling said branches; and means for biasing said devices for operation as a bistable multivibrator.

5. An electrical circuit comprising: first and second circuit branches including, respectively, first and second two-terminal devices each having a volt-ampere characteristic with a region of negative resistance; magnetic means regeneratively coupling said circuit branches; and means for biasing said devices for operation as a multivibrator.

6. The combination comprising: first and second circuit branches including, respectively, first and second two-terminal devices each having a volt-ampere characteristic with a negative resistance region; means magnetically coupling said branches; means for biasing said devices for operation as a multivibrator; and output means connected across one of said devices.

7. An electrical circuit comprising: a first series circuit of a resistance element and a two-terminal device having a volt-ampere characteristic with a negative resistance region; a second series circuit similar to said first series circuit and connected in parallel therewith; means magnetically coupling said first series circuit and said second series circuit with each other; and means for biasing said electrical circuit for operation as a multivibrator.

8. A multivibrator comprising first and second circuit branches connected in parallel and including, respectively, first and second two-terminal devices each having a volt-ampere characteristic with a region of negative resistance; means magnetically coupling said circuit branches; and means for biasing one of said devices in said region of negative resistance.

9. An astable multivibrator comprising first and second circuit branches connected in parallel and including, respectively, first and second two-terminal devices each having a volt-ampere characteristic with a negative resistance region; means magnetically coupling said circuit branches; and means for biasing both of said devices in said negative resistance region.

10. The multivibrator as claimed in claim 9 including means for varying said biasing means selectively.

11. A multivibrator comprising: a first series circuit including a two-terminal device having a volt-ampere characteristic with a region of negative resistance and an element having a first value of resistance; a second series circuit including a second two-terminal device having a volt-ampere characteristic with a region of negative resistance and an element having a second value of resistance different from said first value; means magnetically coupling said first series circuit and said second series circuit; and means for biasing each said device in said region of negative resistance.

12. An electrical circuit comprising: a first series combination of an element of resistance and a two-terminal device having a volt-ampere characteristic with a region of negative resistance, said resistance of said element being less than the dynamic resistance of said device in said region; a second series combination similar to said first series combination and connected in parallel therewith; means biasing each said device in said region of negative resistance; and means magnetically coupling said first series combination and said second series combination.

13. The electrical circuit claimed in claim 12 wherein said coupling means includes a first winding connected in said first series combination and a second winding mutually coupled to said first winding and connected in said second series combination.

14. An electrical circuit comprising: first and second circuit branches connected in parallel and including, respectively, first and second two-terminal devices each having a volt-ampere characteristic with a region of negative resistance; means for biasing one of said devices for monostable operation and for biasing the other of said devices for bistable operation; and energy transfer means intercoupling said branches.

15. The electrical circuit as claimed in claim 14 wherein said energy transfer means is a pair of mutually coupled windings each connected in a different one of said circuit branches.

16. An electrical circuit comprising: first and second circuit branches connected in parallel and including, respectively, first and second two-terminal devices each having a volt-ampere characteristic having two distinct regions of positive dynamic resistance separated by a region of negative dynamic resistance; means for biasing one of said devices such that the load line thereof crosses its said characteristic in one region of positive resistance only; means for biasing the other of said devices such that its load line crosses its said characteristic in both said regions of positive resistance; and energy transfer means intercoupling said circuit branches.

17. The electrical circuit as claimed in claim 16 wherein said two regions of positive resistance are characterized by relatively high and low voltage, respectively, and wherein said load line for said one of said devices crosses its said characteristic only in the region of positive resistance corresponding to said high voltage.

18. The electrical circuit as claimed in claim 16 wherein said energy transfer means comprises first and second mutually coupled windings each connected in a different one of said circuit branches.

19. An electrical circuit comprising: first and second parallel branches including, respectively, first and second two-terminal devices each having a volt-ampere characteristic with a region of negative resistance; magnetic means coupling said branches; means biasing both of said devices for bistable operation; and pulse input means common to said devices.

20. An electrical circuit comprising: first and second circuit branches connected in parallel and including, respectively, first and second two-terminal devices each having a volt-ampere characteristic with a region of negative resistance; magnetic means coupling said branches; means for biasing both of said devices for bistable operation; and means for applying energizing input pulses of one polarity to both of said devices.

References Cited in the file of this patent

UNITED STATES PATENTS

| | | |
|---|---|---|
| 2,581,273 | Miller | Jan. 1, 1952 |
| 2,843,765 | Aigrain | July 15, 1958 |
| 2,944,225 | Bruce et al. | July 5, 1960 |

OTHER REFERENCES

Esaki: Physical Review, vol. 109, 1958, p. 603.